United States Patent [19]

Moore

[11] Patent Number: 5,114,690

[45] Date of Patent: May 19, 1992

[54] TWO STAGE SORPTION OF SULFUR COMPOUNDS

[75] Inventor: William E. Moore, Manassas, Va.

[73] Assignee: The United States of America as represented by the United States Department of Energy, Washington, D.C.

[21] Appl. No.: 697,041

[22] Filed: May 8, 1991

[51] Int. Cl.$^5$ .................. B01J 8/00; C01B 17/00; C01B 17/16; B01D 47/00
[52] U.S. Cl. .................. 423/244; 423/210.5; 423/230; 423/242
[58] Field of Search ............ 423/244 A, 244 R, 210.5, 423/230, 242 A, 242 R

[56] References Cited

U.S. PATENT DOCUMENTS

| 3,873,670 | 3/1975 | Dugan et al. | 423/244 |
| 4,181,704 | 1/1980 | Sheer et al. | 423/244 |
| 4,255,251 | 3/1981 | Durkin | 423/244 |

*Primary Examiner*—Gregory A. Heller
*Attorney, Agent, or Firm*—Judy K. Kosovich; William R. Moser; Richard E. Constant

[57] ABSTRACT

A two stage method for reducing the sulfur content of exhaust gases is disclosed. Alkali- or alkaline-earth-based sorbent is totally or partially vaporized and introduced into a sulfur-containing gas stream. The activated sorbent can be introduced in the reaction zone or the exhaust gases of a combustor or a gasifier. High efficiencies of sulfur removal can be achieved.

15 Claims, 1 Drawing Sheet

TWO STAGE SORPTION OF SULFUR COMPOUNDS

FIELD OF THE INVENTION

The present invention relates generally to methods and apparatus for removing sulfur compounds from gaseous streams. Specifically, limestone or other alkali- or alkaline-earth-based sorbents are rapidly heated to an activated state and then used to remove sulfur compounds in or downstream from a combustor or a gasifier.

BACKGROUND OF THE INVENTION

When certain sorbents are brought into contact with combustion gases containing sulfur compounds, the sulfur compounds react and can be removed. The efficiency of sulfur removal is often lower than that predicted from equilibrium constants. E.g., when limestone is introduced into a combustor, the efficiency of sulfur removal is typically 30–40% because the limestone particles develop a shell of calcium sulfate and the interior of the particles remains unreacted. Improving the efficiency of sulfur removal is desirable because this reduces the quantity of solids that must be disposed of or processed, thereby lowering costs, reducing harmful environmental effects, and improving energy efficiency. Most sulfur removal is based on limestone or calcium compounds because of their low cost and availability.

There are a variety of ways to reduce sulfur emissions produced during combustion. One way is to use solvents to remove the sulfur before combustion. This has not been economical. Another approach, removing sulfur compounds after combustion by scrubbing them from the flue gas, has high capital and high operating costs because of the large volume of combustion gases that must be handled.

Some sulfur-removal/combustion processes require the treatment or the collection of slurries or liquids. Not only is there an energy cost, there is a very large capital cost associated with such processes. For example, the use of a scrubber can add 70 to 100 million dollars to the cost of an installation. The addition of sulfur-absorbing compounds to the combustion process is especially attractive when the reaction product formed is dry. Sulfur-sorbent compounds can be removed in the same step and using the same kind of equipment that is already used to remove ash.

What is needed is a way to improve the efficiency and lower the cost of sulfur removal. Various methods have been attempted in recent years.

U.S. Pat. No. 4,922,840, Woodroffe et al., discloses a method of combustion in which the sorbent is injected into the products of combustion at temperatures of 1600°–2400° K. (2800°–4300° F.). The reaction products are captured at the optimum time. A drawback is that only specialized combustors operate at temperatures much above 1900° K., (3000° F.) the temperature range required to highly activate a calcium-based sorbent.

U.S. Pat. No. 4,503,785, Scocca, discloses a method for reduction of sulfur content of exit gases of combustion whereby concentrated solutions of calcium nitrate or other alkaline earth metal nitrates are injected into the fuel system prior to ignition or into the hottest part of the flame. These nitrates are ingnited with the fuel. Reactants, concentrations, and conditions are such that sulfur compounds are removed as calcium sulfates. One drawback is that, because nitrates are being used, nitrogen compounds would be produced and released, causing air pollution.

U.S. Pat. No. 4,387,653, Voss, discloses fine limestone-based sorbent agglomerated for the removal of sulfur compounds in hot gases. These agglomerates are used in fluidized bed combustion applications and are more reactive than natural limestone granules of the same size. Drawbacks of agglomerates are the expenses associated with the additional materials, including disposal costs and equipment costs.

U.S. Pat. No. 4,312,280, Shearer et al., discloses a method of increasing the sulfation capacity of alkaline earth sorbents by hydrating partially reacted particles in a fluidized bed to crack the sulfate coating, converting the alkaline earth oxide to the hydroxide and increasing surface area available for sulfur sorption.

U.S. Pat. No. 3,933,127, Arps, discloses a means for removing sulfur compounds and silicates from combustion products by passing them through a molten salt bath and removing the by-products as precipitates. As with similar molten salt baths, sulfur removal is limited by gaseous diffusion of sulfur compounds.

U.S. Pat. No. 4,185,080, Rechmeier, discloses a method of reducing emissions of sulfur compounds by combusting sulfur containing fuel in the presence of calcium carbonate or calcium magnesium carbonate to form calcium oxide or calcium magnesium oxide and calcium sulfate or calcium magnesium sulfate. The calcium or calcium magnesium reaction products are then slaked with water to form hydroxide and recycled to the combustion zone or to the combustion gases. This method is useful for limiting the generation of solid waste, but does not improve the efficiency of sulfur sorption.

As disclosed in U.S. Pat. No. 4,922,840, the efficiency of sulfur capture has an optimum temperature as well as an optimum time. Each design of the apparatus and each temperature will have associated with it a sorbent residence time that will affect efficiency.

Sulfur compounds can be reacted with calcium or calcium compounds under oxidizing conditions, reducing conditions, or partially oxidizing conditions. If the calcium is introduced in a vapor state, the first reaction is the formation of CaS. If the calcium is present as the oxide CaO and sufficient oxygen is present, $CaSO_4$ would quickly be formed. Depending on temperature, time, humidity, and oxygen concentrations, decomposition can occur wherein sulfuroxides are released from the sorbent/sulfur compound.

Other sorbents also combine with sulfur. For example, potassium carbonate has been used successfully in magnetohydrodymanic combustors with potassium to sulfur molar ratios between 1.2 and 1 with more than 95% sulfur removal. ("$SO_2$ Tests to Meet State of Tennessee Requirements, EPA Performance Tests for Particulate and $SO_2$ Conducted at the DOE Coal Fired Flow Facility," D. G. Rasnake et.al., presented at 28th SEAM, June 1990, Chicago, Ill. and "Emission Control by Magnetohydrodynamics," R. Attig and J. Chapman, ChemTech, page, 694, November 1988. Another advantage of potassium is that corrosion is diminished by an order of magnitude by the presence of the potassium-sulfur salts. ("MHD Bottoming Cycle Operations and Test Results at the Coal Fired Flow Facility," N. R. Johanson and J. W. Muehlhauser, presented at 2nd International Workshop on Fossil Fuel Fired MHD Retrofit of Existing Power Plant, Bologna, Italy Mar.

21-23, 1990. See also "500 Hour Superheater/ITAH Tube Corrosion in the CFFF," M. White and M. Le, 28th Symposium on Engineering Aspects of Magnetohydrodynamics, VII.5-1.

SUMMARY OF THE INVENTION

The invention is a method for reducing the sulfur content of exhaust gases. An alkali or alkaline-earth-based sorbent is rapidly heated to a highly activated state. The highly activated sorbent can be all vapor or it can be a mixture of molten and vaporized sorbent, observable as a spongy or puffy substance. In the case of calcium oxide, heating must be to temperatures of approximately 3500° F. or higher to produce the highly activated state. In the case of potassium carbonate, vaporization can be accomplished at about 1750° F.

The highly activated sorbent can be injected into the reaction zone of a combustor or gasifier. The sorbent can also be injected into the exhaust stream of a combustor or gasifer. Quenching and collecting methods include a cyclone and a molten salt bath. Sulfur compounds are picked up by the sorbent material, and the sulfur-containing sorbent is rapidly removed and quenched to prevent decomposition.

DETAILED DESCRIPTION OF THE PREFERRED EMBODIMENT

Figure 2:
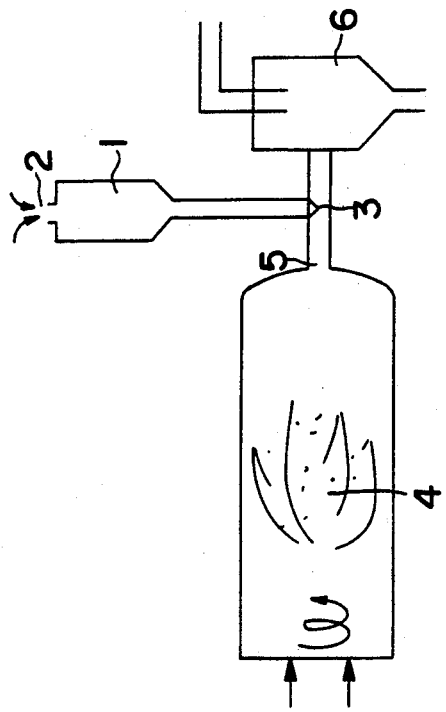
FIG. 2 is a schematic representation of the various operations when activated sorbent is injected into exhaust gases. Alkali and alkaline-earth sorbents which may be used include oxides and carbonates of potassium, calcium, magnesium, cerium, and cesium.
Figure 1:
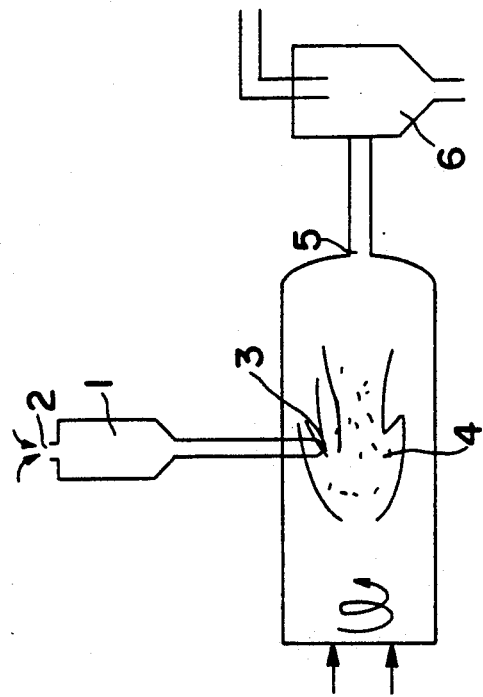
FIG. 1 is a schematic representation of the various operations when activated sorbent is injected into the reaction zone.

Preparation of CaO or Ca(OH)$_2$ for sorbent use requires physical softening at approximately 3500° F. or higher. This can be achieved with an off-base sorbent heater, such as a gas-fired/oxygen-rich adiabatic combustor or with a plasma heat source such as an electrical arc heater. One adiabatic combustor is a Thagard reactor manufactured by Thagard Research Corporation, Costa Mesa, Calif. It can provide sufficiently high temperatures to totally vaporize and disassociate calcium oxide sorbents. Thagard indicates in their commercial literature that up to 99 percent sulfur control can be achieved at ultra high temperatures above 4500° F. Vaporized sorbent achieves the highest efficiencies because sulfur capture is not limited by diffusion of sulfur compounds to a surface.

The sorbent is fed to the sorbent heater as a fine powder, e.g., 300 or 400 mesh. Preferably, the sorbent heater is an off-base preparatory combustor 1, preferably a gas-fired, oxygen-enriched adiabatic combustor. This combustor includes an entry port 2 through which the fine alkaline-earth-based sorbent is metered and injected. Fuel and oxygen (or air) are injected in port 2 and the activated sorbent exits through nozzle 3. Sorbent activation conditions are controlled by conventionally adjusting the proportions of fuel, oxygen, and sorbent, the presence of air, flow rates of sorbent, fuel, and oxygen (or air), the size and shape into the adiabatic combustor, and so forth.

Though highly effective calcium sorbent vapor can be prepared at very high temperatures (4500°–5000° F.) in an adiabatic high flow reactor, it is costly and unnecessary to do so. A certain amount of Ca vapor can also be formed at lower temperature (below 3500° F.) under locally reducing conditions in the gas plasma by reactions such as:

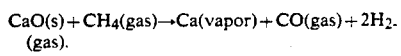

$$CaO(s) + CH_4(gas) \rightarrow Ca(vapor) + CO(gas) + 2H_2(gas).$$

For further discussion of metal vaporization under locally reducing conditions, see "Metal Vaporization during Pyrolysis," 1983 M.S. thesis, Dept. of Chem. Eng., MIT, Cambridge, Mass. The highly activated sorbent can be all vapor or it can be a mixture of molten and vaporized sorbent, observable as a spongy or puffy substance.

The next step is the tangential injection of the highly activated molten or vaporous alkali- or alkaline-earth-based sorbent into the reaction zone 4, downstream from the area in which incoming air and fuel enter and are mixed. In a gasifier, the sorbent material reacts with hydrogen sulfide gas to form calcium sulfide. In a combustor, the sorbent material reacts with sulfur oxides and oxygen to form calcium sulfate. Once the calcium sulfate is formed, it must be quenched quickly or it will begin to decompose, releasing SO$_2$.

The sorbent/sulfur compounds and ash exit the reactor through exit port 5 and are collected in a cyclone separator 6. These solids exit the cyclone for disposal or other applications.

Other alkali- or alkaline-earth-based sorbents can also be used with this two-stage process, e.g., potassium, cesium, and cerium oxide. Potassium has been shown to be very effective for sulfur control when used as a vapor in coal fired MHD combustors. Where generally as non-corrosive as shown by MHD data, it can also be used in power systems using open-cycle gas turbines.

EXAMPLES

The sorbent heater was a model SC-B1 model plasmatron plasma spray unit manufactured by Miller Thermal Technologies Plasmadyne Division, Tustin Calif. It is rated at 750 amps at 38 volts and is capable of sustaining approximately 4500° F. using 60 cubic foot of helium arc gas to feed and activate approximately two pounds per hour of sorbent.

Metered and injected with a star wheel feeder was 300 mesh agricultural lime, carried by helium flowing at a rate of approximately 1.5 lbs/hr. The helium carrier gas moved the sorbent thru the electrical arc, where the sorbent's physical characteristics were changed.

The primary combustor was a natural gas combustor rated at 13,000 standard cubic foot per hour and 1.1 million Btu (products of combustion −13,000 BTU/lb) output. The inside diameter of the reaction zone was 12 inches. The reaction zone operated at approximately 2800° F. Residence times were between 250 milliseconds and one second.

The highly activated sorbent was injected directly downstream of the primary reaction zone (2400° F.). Due to sealing problems with the plasma gun, the combustion system pressure was below 4 atmospheres. Consequently, the total products of combustion flow were reduced to approximately 4000 standard cubic foot per hour. If the primary combustor was a direct coal-fired turbine, higher pressures are expected to provide higher energy efficiencies, and possibly higher sorbent efficiencies. However, these conditions were not tested.

To simulate a 3 percent sulfur coal, approximately 1.74 lbs per hour of liquid $SO_2$ was metered and injected into the combustion reaction zone. The calcium to sulfur ratio was approximately 1 to 1, from which an operational test baseline of approximately 5000 PPM of $SO_2$ was established downstream in the exhaust stream. A flu stack sulfur analyzer measured the overall reduction in sulfur gas concentration. The analyzer consistently read 500 ppm or less, with an overall efficiency removal from 93 percent to an overall average of 90 percent.

An attempt was made to identify the gross physical changes in the calcium sorbent induced by the sorbent heater. A plasmatron plasma spray unit (750 amps at 38 volts) was fed calcium carbonate at approximately 1.5 lbs/hr. Sorbent passed through the intense electrical arc heat zone and was sprayed directly onto a metal plate. The sorbent underwent major physical changes, exhibiting a spongy-puffy appearance with a large amount of the expanded material adhering to the plate.

For a baseline the sorbent was sprayed onto plate with heat off. The unheated sorbent was unchanged, exhibiting no tendency to adhere to the plate.

What is claimed is:

1. A method for reducing the sulfur content of exhaust gases from the combustion of hydrocarbons, comprising:
   rapidly heating an alkali- or alkaline-earth-based sorbent powder to a temperature near its vaporization point so that the sorbent becomes an activated sorbent comprising part vapor and part liquid;
   injecting the activated sorbent into a sulfur-containing gas stream so as to form sulfur-containing sorbent; and
   quenching and collecting the sulfur-containing sorbent.

2. The method of claim 1 wherein the sulfur-containing gas stream is in the reaction zone of a combustor.

3. The method of claim 1 wherein the sulfur-containing gas stream is the exhaust gas stream of a combustion process after reaction in a combustor.

4. The method of claim 1 wherein the alkali- or alkaline-earth base of the sorbent is chosen from the group: calcium, potassium, cesium, cerium, magnesium, or barium.

5. The method of claim 1 wherein the physical state of the activated sorbent is amorphous.

6. The method of claim 1 wherein the sorbent power is activated in an inert environment.

7. The method of claim 1 wherein the sorbent power is potassium carbonate.

8. The method of claim 1 wherein the method of rapid heating of the sorbent power is a plasma arc rig.

9. The method of claim 1 wherein the method of rapid heating is a gas-fired, oxygen-enriched adiabatic combustor.

10. The method of claim 1 wherein:
    the sorbent powder is CaO; and
    rapid heating is to between 3400° and 4500° F. under reducing conditions.

11. The method of claim 1 wherein the sorbent power is $K_2CO_3$ and rapid heating is to a temperature of approximately 1750° F.

12. A method for reducing the sulfur content of gas streams as in claim 1, comprising:
    rapidly heating a calcium-based sorbent powder under reducing conditions to temperatures of at least 3400° F.

13. A method for reducing the sulfur content of compounds produced from the gasification of coal, comprising:
    rapidly heating an alkali- or alkaline-earth-based sorbent powder to a temperature nearly at its vaporization temperature so that the sorbent powder becomes spongy-puffy and partially vaporized to form an activated sorbent;
    injecting the activated sorbent into a sulfur-containing gas stream so as to form sulfur-containing sorbent; and
    quenching and collecting the sulfur-containing sorbent.

14. The method of claim 13 wherein the sulfur-containing gas stream is the reaction zone of a combustor.

15. The method of claim 13 wherein the sulfur-containing gas stream is the product stream of a gasifier.

* * * * *